April 2, 1929.                    W. VOGEL                    1,707,376
    MEANS FOR MAINTAINING A GIVEN SPEED OF DRIVEN MACHINE
      SHAFTS, PARTICULARLY OF PAPER MAKING MACHINES
                  Filed March 29, 1928          3 Sheets-Sheet 1
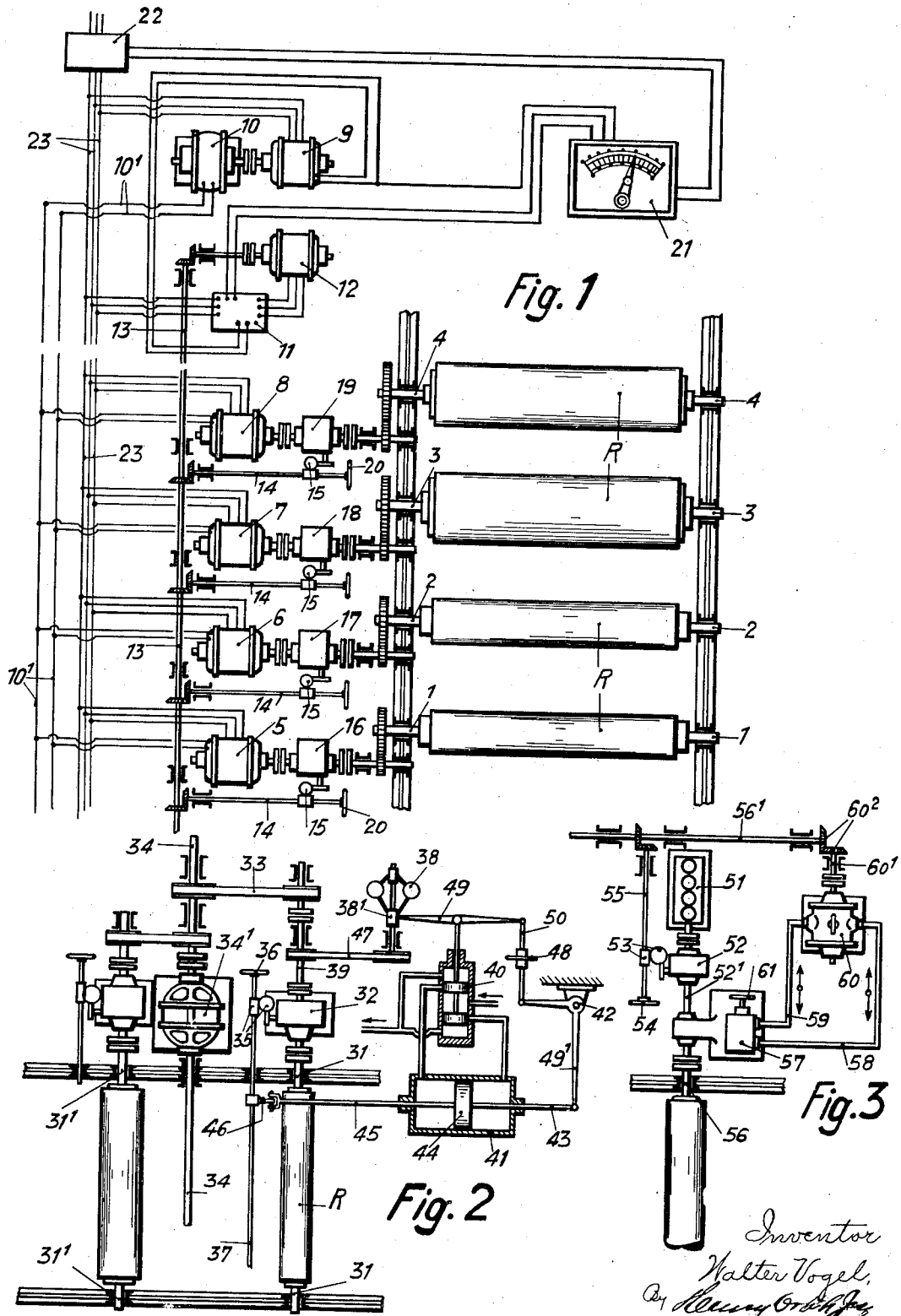

April 2, 1929.  W. VOGEL  1,707,376
MEANS FOR MAINTAINING A GIVEN SPEED OF DRIVEN MACHINE
SHAFTS, PARTICULARLY OF PAPER MAKING MACHINES
Filed March 29, 1928   3 Sheets-Sheet 2
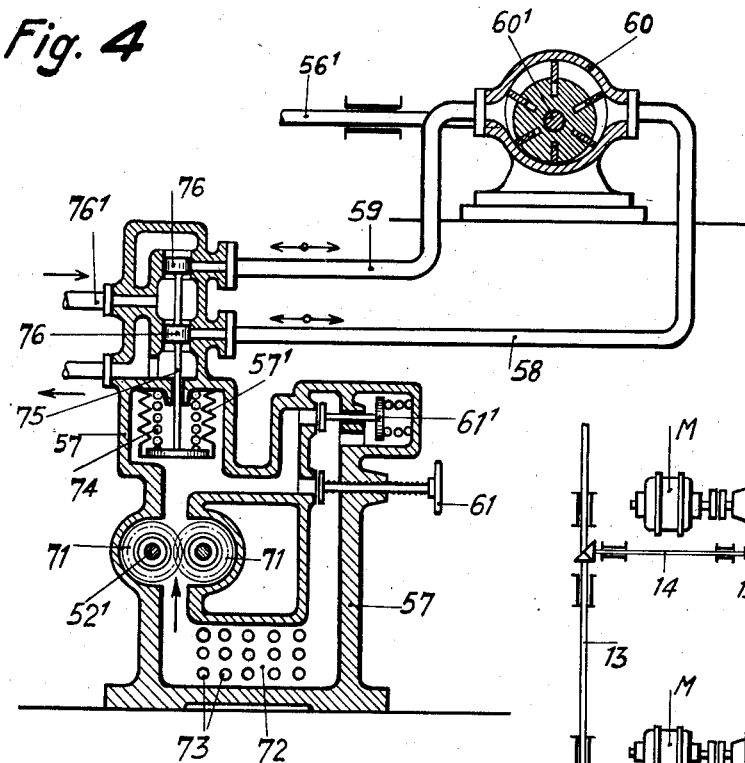
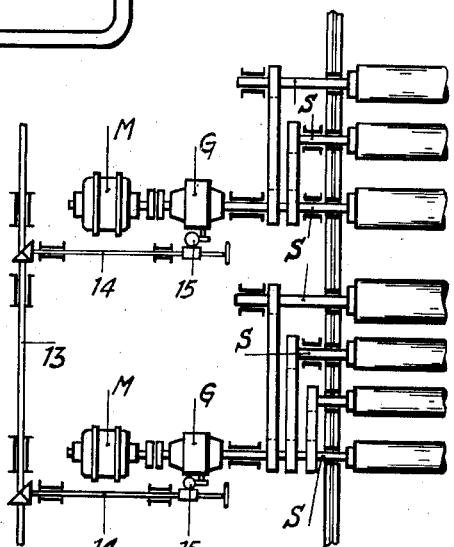
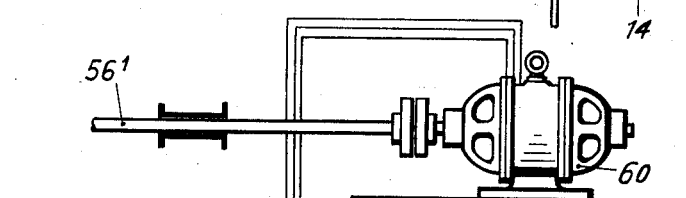
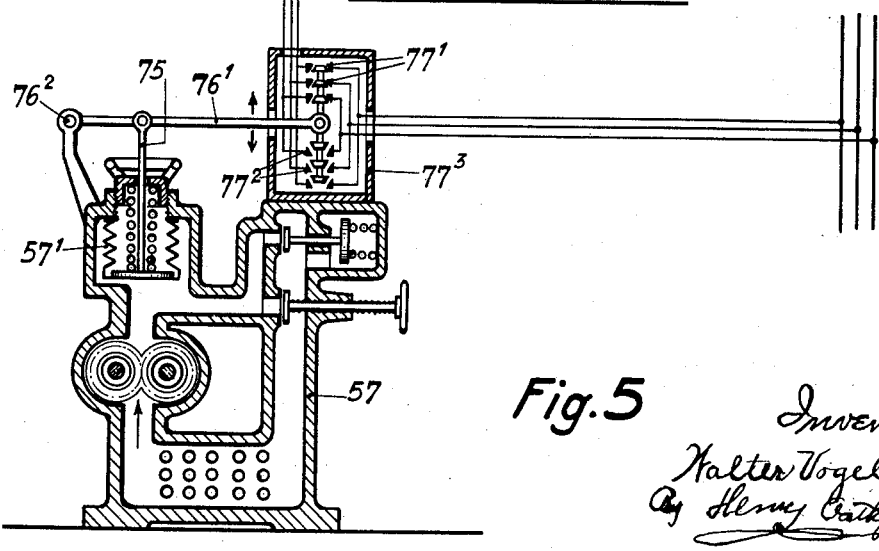

April 2, 1929. W. VOGEL 1,707,376
MEANS FOR MAINTAINING A GIVEN SPEED OF DRIVEN MACHINE
SHAFTS, PARTICULARLY OF PAPER MAKING MACHINES
Filed March 29, 1928 3 Sheets-Sheet 3

Patented Apr. 2, 1929.

1,707,376

UNITED STATES PATENT OFFICE.

WALTER VOGEL, OF ZURICH, SWITZERLAND, ASSIGNOR TO THE FIRM AKTIENGESELL-SCHAFT DER MASCHINENFABRIKEN ESCHER WYSS & CIE., OF ZURICH, SWITZERLAND.

MEANS FOR MAINTAINING A GIVEN SPEED OF DRIVEN-MACHINE SHAFTS, PARTICULARLY OF PAPER-MAKING MACHINES.

Application filed March 29, 1928, Serial No. 265,712, and in Switzerland April 7, 1927.

This invention relates to means for maintaining a given speed of driven machine shafts and it has especial reference to paper making machines, in which the shafts are driven through at least one change speed gear.

In such machines it has already been proposed to drive those shafts which have to run temporarily at a given high speed and temporarily at a given lower speed, through a change speed gear driven by constant speed driving means. Under these circumstances the range of adjustment of the ratio of transmission of the gear is made such that it suffices both for the common regulation of the speed of all shafts and for the tension or draw-adjustment of each individual shaft of the machine. Such means cannot however be employed in all those cases where a source of power which permits the change speed gear to be driven at a constant number of revolutions per minute is not available. Furthermore, such means cannot be used if there is any liability of slip taking place in the change speed gear, for in this case the driven shaft, notwithstanding the fact that the change speed gear is adjusted to impart a given number of revolutions per minute thereto, will not run at the desired given speed. Thus, in machines in which the ratios of the different peripheral velocities of a number of shafts must be accurately kept as is the case, for instance, in paper making machines with regard to the speed of the wet presses, the drying parts, the calender and the reeler the appearing of any slip in the change speed gears causes at once irregularities in working.

The present invention has for its object to overcome the disadvantage referred to in arrangements of the kind above mentioned wherein the shafts are driven through at least one change speed gear. To this end, according to the invention, when undesirable variations in the speed of rotation of the primary or secondary shaft of the change speed gear occur, a governing device, the actuation of which depends upon such speed variations, varies the ratio of transmission of the gear automatically, in such a way as to maintain constant the speed of rotation of the secondary shaft and thereby of the driven shafts of the machine.

Various constructions in accordance with the invention are illustrated, by way of example, in the accompanying drawings in which:

Fig. 1 shows diagrammatically an arrangement for a paper making machine, in which each of the shafts to be driven at a given speed is operated by its own motor through a change speed gear, while the governing device which is to be controlled in accordance with variations in the speed of rotation, is designed as an electric governor.

Fig. 2 shows diagrammatically an arrangement in which an adjusted, given speed of a driven shaft is maintained by means of a centrifugal governor, which is driven from the primary shaft of a change speed gear which actuates the shaft to be driven.

Fig. 3 shows part of an arrangement in which the governing device, actuated in dependence upon undesired variations in the rotary speeds of a change speed gear, is operated by hydraulic means, Fig. 4 is a vertical cross-section on an enlarged scale through details of the arrangement shown in Fig. 3, and Fig. 5 shows also on an enlarged scale, details of a modification of the governing device.

Fig. 8 shows a further modification of a detail.

Figure 6:
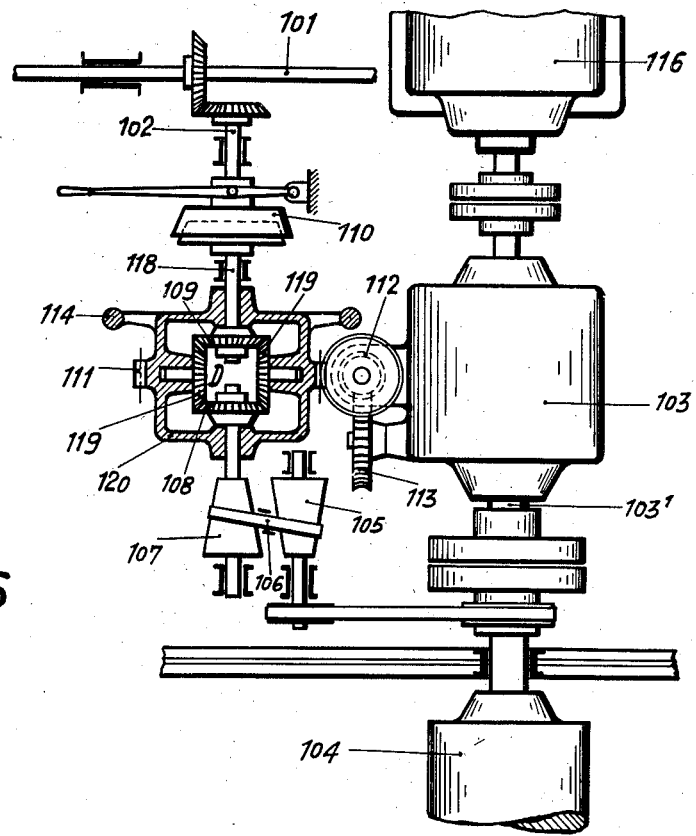
Fig. 6 shows an arrangement in which the governing device actuated in dependence upon undesired variations in the rotary speeds of the change speed gear is constructed as a differential gear.

In Fig. 1, the numerals, 1, 2, 3 and 4 denote shafts, each of which carries a roll R of a paper making machine. Each of said shafts 1, 2, 3, 4 has to run at given speed and to this end it is driven by its own motor 5, 6, 7 and 8 respectively, through change speed gears 16, 17, 18 and 19 respectively. The motors 5, 6, 7, 8 are three-phase motors synchronized by a continuous current and are connected up to common mains 23. The conductors 10¹ supply the continuous current required for synchronization which current is supplied by a generator 10, driven by a synchronous motor 9. 13 is a control shaft common to all the change speed gears 16, 17, 18, 19 and from it supplementary shafts 14, each fitted with a hand wheel 20, branch off to each of the said gears respectively. This control shaft 13 is driven by a motor 12 the running of which is influenced by an electrical governor 11. Numeral 15 denotes mechanisms for altering the ratio of transmission of the change speed gears 16, 17, 18, 19 each mechanism 15 being in operative connection with the supplementary shaft 14 belonging to its particular change speed gear. The arrangement described may be controlled from a control station 21, whereat the whole of the mechanism can, when necessary, be switched off from the mains 23 by means of a switch 22.

Let it now be assumed that, in the arrangement above described, a change of frequency, for example, takes place in the mains 23. This change at once exerts an influence on the speed of rotation of the synchronous motor 9, and the generator 10 will consequently run faster or slower, which will result in a change in the voltage of the continuous current produced. This change of voltage is used so to influence, through the medium of the governor 11, the motor 12, which operates the control shaft 13, that the geared changing mechanisms 15 actuate the change speed gears 16, 17, 18, 19 automatically such wise as to maintain constant the rotary speed of the secondary shafts of these gears. In this way the predetermined speeds of the shafts 1, 2, 3, 4 respectively driven by the gears 16, 17, 18 and 19 are maintained constant.

In Fig. 2 the numeral 31 denotes a driven shaft carrying a roll R, which is to run at a predetermined speed and which is driven through a change speed gear 32 and a belt drive 33 from a shaft 34 connected to a driving motor 34¹. Shaft 34 forms the common driving shaft of a number of shafts corresponding to the shaft 31 and of which only shaft 31¹ is further shown. Numeral 35 designates a mechanism used to vary the velocity ratio of the change speed gear 32 and actuated from a control shaft 37. This latter may be operated by hand with the aid of a hand wheel 36 and also automatically in a manner hereinafter to be described through the agency of a governing device 38 designed as a centrifugal governor. The governor 38 is driven through a belt drive 47 from the primary shaft 39 of the change speed gear 32, though it could as well be driven from the secondary shaft of this gear. To the sleeve 38¹ of the governor 38 is connected a lever 49, to which is connected firstly, a controlling piston 40 and secondly, a rod 50 carrying a manual adjusting device 48. The piston 40 controls the admission and exhaust of a liquid under pressure to and from a cylinder 41, in which works a piston 44. This latter is operatively connected, on the one hand, by the piston rod 43 and a bell crank lever 49¹, pivoted at 42, to the rod 50 and, on the other hand, by the piston rod 45 and lever 46 to the control shaft 37. The parts 49¹, 50, 49 act as so called " restoring device ".

If in the arrangement according to Fig. 2, the rotary speed of the primary shaft 39 of the gear 32 varies for any reason, the number of revolutions per minute of the governor 38 will vary accordingly. This will result in such a movement of the controlling piston 40 that fluid under pressure can flow into one of the chambers of the cylinder 41 provided on both sides of its piston 44. The rod 45 will therefore be moved and will continue to move until the ratio of transmission of the gear 32 is so varied by the control shaft 37 that, notwithstanding the new speed of the primary shaft 39 of the gear 32, its secondary shaft still drives the shaft 31 at the predetermined speed.

Figs. 3 and 4 show a construction in which when undesired changes take place in the rotary speed of the secondary shaft of a change speed gear 52, the governing device 57 is influenced hydraulically in dependence on such changes. The driven shaft which is to run at a given speed is here denoted by numeral 56. The change speed gear 52 is driven from an engine 51 which may, for example, be a Diesel motor, a turbine or an electric motor, and an arrangement 53, provided in conjunction with this gear 52 to vary the velocity ratio, may be operated through the medium of a shaft 55 either manually by means of a hand wheel 54 or from the governing device 57 through a control shaft 56¹ and a controlling motor 60. Said governing device 57 may be manually controlled by means of a wheel 61, and it is in operative connection by pipes 58, 59 with the controlling motor 60.

Fig. 4 shows details of the hydraulically operated governing device 57 and of the controlling motor 60 on a larger scale. In this figure the governing device 57 comprises a diaphragm 57¹ influenced by a spring 74 and numeral 71 denotes a fluid feed pump which is driven from the secondary shaft 52¹ of the change speed gear 52 (the latter being only shown in Fig. 3). The pump 71 draws liquid from a chamber 72 provided with a cooling arrangement 73 and delivers it within the range of operation of the bellows-like diaphragm 57¹, the lifting movements of which are transferred by a rod 75 to a piston valve 76 controlling the admission of a fluid under pressure supplied through a pipe 76¹ to the pipes 58 and 59 connected to the controlling motor 60. When fluid under pressure flows through pipe 58 into the motor 60, the latter will rotate in a counter clockwise direction whilst it rotates in a clockwise direction when fluid under pressure is supplied through pipe 59 to said motor 60. Thus, the movements of the piston valve 76 initiated by the diaphragm $57^1$ are converted into a rotary movement of the shaft $60^1$ of the controlling motor 60 operating through the bevel gear $60^2$ (Fig. 3) the control shaft $56^1$. For the sake of completeness it may be pointed out that in Fig. 4 the numeral 61 denotes the hand wheel already mentioned in connection with Fig. 3 and which allows the cross sectional area of a throttle for the liquid circulated by the pump 71 to be varied, whereby the pressure of the liquid acting on the diaphragm 57 is also varied, thus affording means for manual control of the rotary speed. Numeral $61^1$ denotes a spring controlled safety valve.

In the arrangement shown in Figures 3 and 4 the movements made by the diaphragm $57^1$ depend on the working of the pump 71 and therefore primarily on the speed of the secondary shaft $52^1$ of the gear 52, (Fig. 3). If, for example, this secondary shaft $52^1$ runs at a speed greater than the predetermined speed of the shaft 56 to be driven, the pump 71 will deliver more, and since the throttling cross sectional area controlled by the hand wheel 61 remains unchanged, an increased pressure will be exerted on the diaphragm $57^1$, so that the latter will be compressed. This causes such a movement of the parts 75, 76, 60, $56^1$, 55 and 53 that the ratio of transmission of the gear 52 is automatically influenced in a sense tending to keep the predetermined rotary speed of the secondary shaft $52^1$ of the gear 52 constant.

The construction shown in Fig. 5 differs from that shown in Fig. 4 in that the lifting movement of the diaphragm $57^1$ is transferred by the rod 75 to a lever $76^1$ pivoted at $76^2$. This lever co-operates with rows of electrical contacts $77^1$ and $77^2$ of a device $77^3$ in such a manner, that the movements of the mechanical parts 75, $76^1$, initiated by the diaphragm $57^1$ are converted in each case into electrical actions, affecting the working of the electrical motor 60 operating the control shaft $56^1$.

Fig. 6 shows a construction in which the governing device which is influenced by undesired changes in the number of revolutions per minute of the change speed gear is designed as a differential gear. In this figure numeral 103 denotes the change speed gear driven by an electric motor 116, the secondary shaft $103^1$ of said gear being coupled to the shaft 104 which has to be driven at a predetermined speed. Numeral 101 denotes a control shaft which is common to the shaft 104 and to a number of other shafts corresponding thereto but not shown. When the speed of the machine is once adjusted, said shaft 101 runs at a constant speed. In conjunction with each of the last named shafts is provided a supplementary shaft 102, driven from the control shaft 101 through a bevel wheel gear 117. Each shaft 102 drives through a clutch 110 which permits of their being individually influenced, a shaft 118, on which is mounted a gear wheel 109 of a differential gear D which constitutes the governing device. Another wheel 108 of this differential gear is driven through a cone pulley drive 105, 106, 107 from the secondary shaft $103^1$ of the change speed gear 103. Numeral 120 denotes the central member of the differential gear D which carries two gear wheels 119, both of which gear into the gear wheels 108 and 109. The central member 120 has also on its external periphery a gear wheel 111 which gears into a gear wheel 112 of a double helical gear. The second gear wheel 113 of this helical gear is in operative connection with the arrangement (not shown) for varying the ratio of transmission of the change speed gear 103.

As long as the shaft 104 runs at the proper predetermined speed, the wheels 108 and 109 run at the same number of revolutions so that the central member 120 is not rotated. As soon, however, as any divergence of the speed of the secondary shaft of the gear 103 from the given speed takes place, the central member 120 will be rotated and the double helical gear 112, 113 will then act in such a way as to keep the number of revolutions of the secondary shaft $103^1$ of the gear 103 constant. The cone gear 105, 106, 107 permits of a desired individual adjustment of the speed of the shaft 104.

Figure 7:
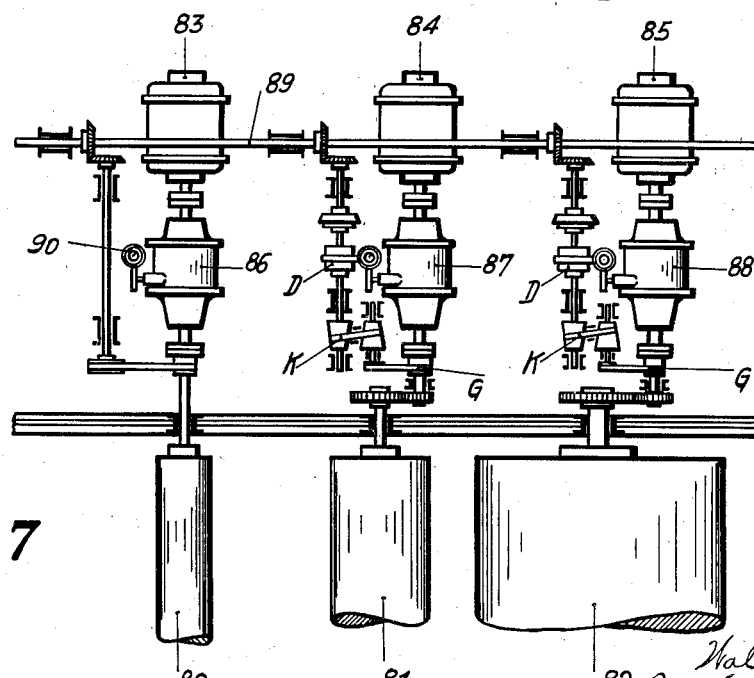
Fig. 7 shows the use of the invention in a case where the ratio of the speed of a number of rollers is to be kept constant in relation to the speed of a determinate roller.

Fig. 7 shows how the invention can be applied when the ratio of the speed of a number of shafts is to be kept constant in relation to the speed of a certain shaft. Numerals 80, 81, 82 denote rolls carried by shafts of a paper making machine, which are driven by motors 83, 84 or 85, respectively, through change speed gears 86, 87 and 88 respectively. 83, 86, 80 constitutes a so called tachometer group, that is to say, the group with the speed of which the speeds of the remaining rolls 81, 82—each of which has to run during normal working conditions at a definite predetermined speed—must also maintain constant ratios. The shaft of the roller 80 drives a governing shaft 89 at a constant ratio of transmission. A wheel 90 serves for the adjustment of the ratio of transmission of the gear 86. The tachometer group may be kept with regard to the influences occuring on the side of the primary shaft of the change speed gear 86 at an absolutely constant number of revolutions per minute by suitable means, that is to say, the governing device which in the arrangement shown for instance in Fig. 1 acts on the controlling shaft 13, can be brought into operative connection with the wheel 90. The governing shaft 89 may control—as long as it runs at the same speed—through regulating devices (constructed in this case also as differential gears D) the ratio of transmission of the gears 87 and 88 in the manner described with reference to Fig. 6. G and K are gears which serve to drive one part of the differential gear D through the secondary shaft of the change speed gear 87 or 88 respectively. At the same time the cone gears K permit the speed of the rolls 81, 82 to be influenced exactly as in the arrangement shown in Fig. 6, in the desired sense individually. If in the arrangement shown in Fig. 7 the speed of the roll 80 varies for any reason, immediate variation of the speed of the regulating shaft 89 results. The consequence of this is that the differential gears D will be so actuated to control the ratios of transmission of the gears 87, 88 that the ratio between the speed of the roller 80 and the speeds of the rolls 81, 82 remains constant. As soon as the ratio between the speeds of the shaft 80, 81, 82 that must be kept constant is restored, the governing shaft 89 has again only the tendency to keep constant the new speed that has been adjusted in the manner just described. The same thing takes place if the rolls 81, 82 should, for any reason, begin to run at a speed different from that which is in correct ratio to the speed of the roll 80. Any desired variation in the speed of the various rolls 81, 82 (tension—or draw—adjustment) can on the other hand be secured by the aid of the cone gears K.

As shown in Fig. 8, the arrangements above described may also be used in group driving, that is to say, in cases in which each motor M has to drive a number of shafts S through a change speed gear G. In this case the change speed gears G of the driving motors M for the various groups are operatively connected by means of shafts 13, 14 and mechanisms 15 in the same way as is above described with reference to the arrangements shown in Fig. 1, for the purpose of maintaining definite predetermined rotary speeds of the driven shafts of a machine.

I claim:

1. Means for maintaining a given speed of rotation of driven shafts, particularly in the case of paper making machines comprising in combination, a plurality of shafts, means for driving said shafts and including at least one change speed gear having a primary and a secondary shaft, and a governing device influenced in dependency on variations in the number of revolutions per minute of the primary or secondary shaft of the said change speed gear and adapted to automatically vary the velocity ratio of said gear so as to maintain a constant speed of rotation of the secondary shaft thereof and thereby of the driven shafts of the machines.

2. Means for maintaining a given speed of rotation of driven shafts, particularly in the case of paper making machines, comprising in combination, a plurality of shafts, means for driving said shafts and including at least one change speed gear having a primary and a secondary shaft, a differential gear influenced by the secondary shaft of said change speed gear and adapted to vary the velocity ratio of said change speed gear, and a governing shaft running at a given and constant number of revolutions per minute and influencing said differential gear so that when change occurs in the velocity ratio of said governing shaft and said secondary shaft the ratio of transmission of the change speed gear is so varied that the original ratio of the number of revolutions per minute of the two last mentioned shafts is again restored.

3. Means for maintaining a given speed of rotation of driven shafts, particularly in the case of paper making machines, comprising in combination, a plurality of shafts, means for driving said shafts and including a change speed gear for every shaft, a governing device fitted to every change speed gear, a governing shaft driven by one of said shafts at a constant ratio of transmission, and means operatively connecting said governing shaft and the governing devices of the change speed gears for influencing the governing devices of the change speed gears of the remaining shafts to be driven so as to maintain constant the speed of rotation of said remaining shafts and to keep constant the ratio between the speeds of all shafts to be driven when undesired changes occur in the speed of rotation of the shaft driving the governing shaft.

4. In a paper making machine, in combination, a plurality of shafts, means for driving said shafts and including a change speed gear for every shaft to be driven, a governing device fitted to every change speed gear for altering the transmission ratio, a governing shaft driven by one of said shafts at a constant ration of transmission, means operatively connecting said governing shaft to said governing devices for influencing the latter and thereby the speed of rotation of the remaining shafts to be driven, and means interposed in said connecting means for individually altering the speed of said remaining shafts.

5. In a paper making machine, in combination, a plurality of shafts, means for driving said shafts and including a change speed gear for every shaft to be driven, a governing device fitted to every change speed gear for altering the transmission ratio, a governing shaft driven by one of said shafts at a constant ratio of transmission, means operatively connecting said governing shaft to said governing devices for influencing the latter and thereby the speed of rotation of the remaining shafts to be driven, said means including a differential gear, and means interposed in said connecting means for individually altering the speed of said remaining shafts.

In testimony whereof I have signed my name to this specification.

WALTER VOGEL.